United States Patent [19]

Warren

[11] Patent Number: 4,606,582
[45] Date of Patent: Aug. 19, 1986

[54] DECORATIVE WHEEL COVERING

[75] Inventor: Perry A. Warren, Campbell, Calif.

[73] Assignee: Kaper II, Inc., Paramount, Calif.

[21] Appl. No.: 633,718

[22] Filed: Jul. 23, 1984

[51] Int. Cl.$^4$ ............................................. B60B 7/06
[52] U.S. Cl. ................................. 301/37 S; 301/108 S
[58] Field of Search ................. 301/37 S, 37 R, 37 P, 301/108 R, 108 S, 108 A, 37 H, 37 CM, 37 SC

[56] References Cited

U.S. PATENT DOCUMENTS

| | | | |
|---|---|---|---|
| 1,959,255 | 5/1934 | Zerk | 301/37 S |
| 2,092,975 | 9/1937 | Hunt et al. | 301/37 SS |
| 2,181,364 | 11/1939 | Burger | 301/37 S X |
| 2,944,853 | 7/1960 | Lyon | 301/37 S |
| 3,288,488 | 11/1966 | Shinn | 301/37 S |
| 3,653,719 | 4/1972 | Osawa et al. | 301/37 S |
| 3,726,566 | 4/1973 | Beith | 301/37 R |
| 4,240,670 | 12/1980 | Zorn et al. | 301/37 S X |

FOREIGN PATENT DOCUMENTS

| | | | |
|---|---|---|---|
| 1308293 | 2/1973 | United Kingdom | 301/37 S |
| 1327391 | 8/1973 | United Kingdom | 301/37 R |

Primary Examiner—Robert B. Reeves
Assistant Examiner—Russell D. Stormer
Attorney, Agent, or Firm—Edgar W. Averill, Jr.

[57] ABSTRACT

A decorative wheel covering for use on truck vehicles or the like defines a wheel cover supported only at its center portion and having a contour closely matching the underlying wheel. A plate covering covers the truck wheel assembly mounting plate and hub to complete the wheel covering.

7 Claims, 8 Drawing Figures

U.S. Patent   Aug. 19, 1986   Sheet 1 of 3   4,606,582
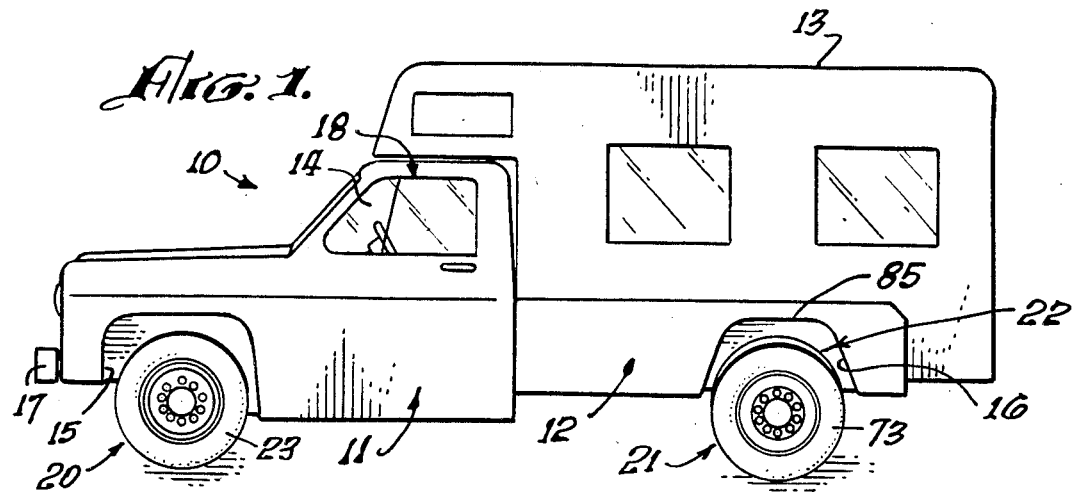
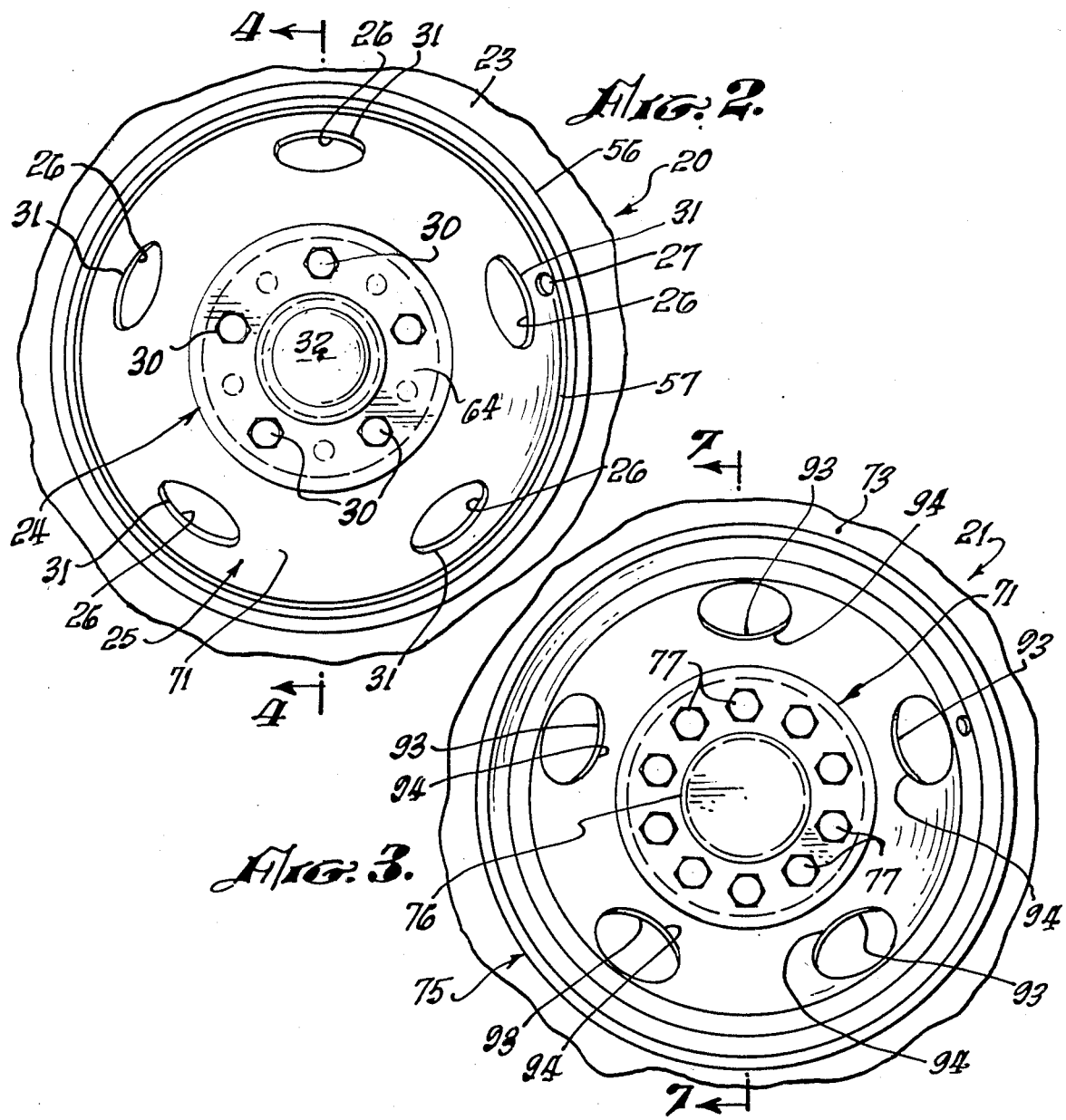

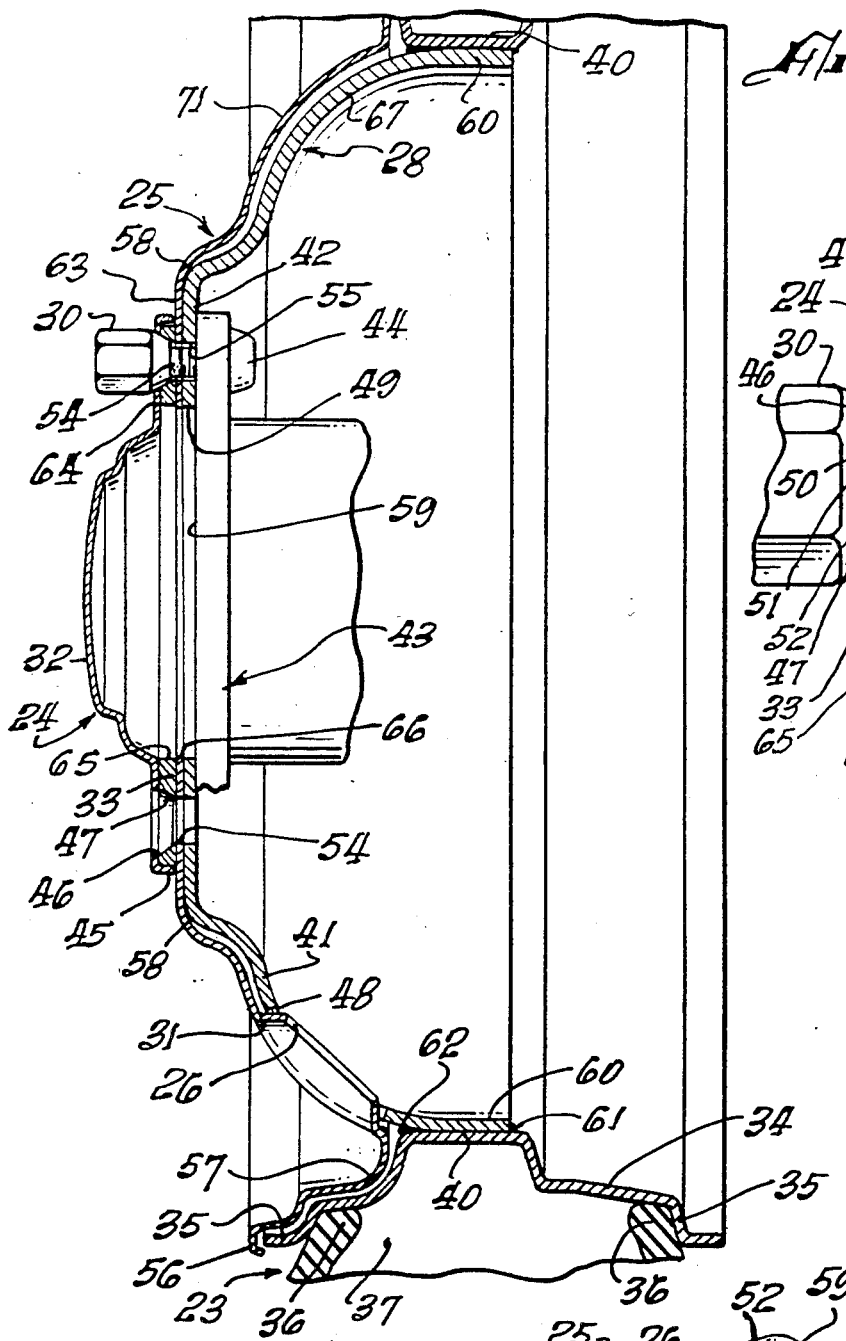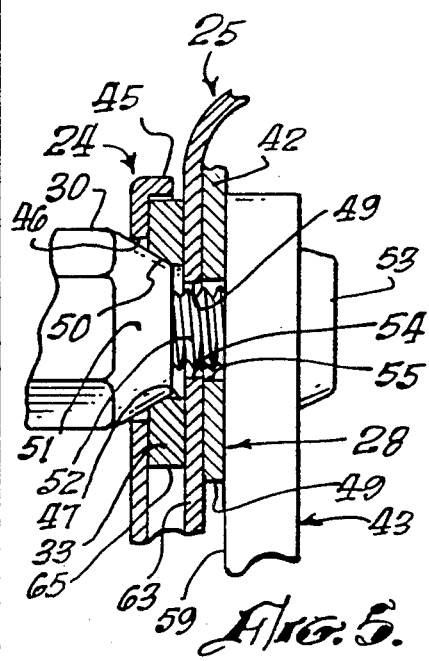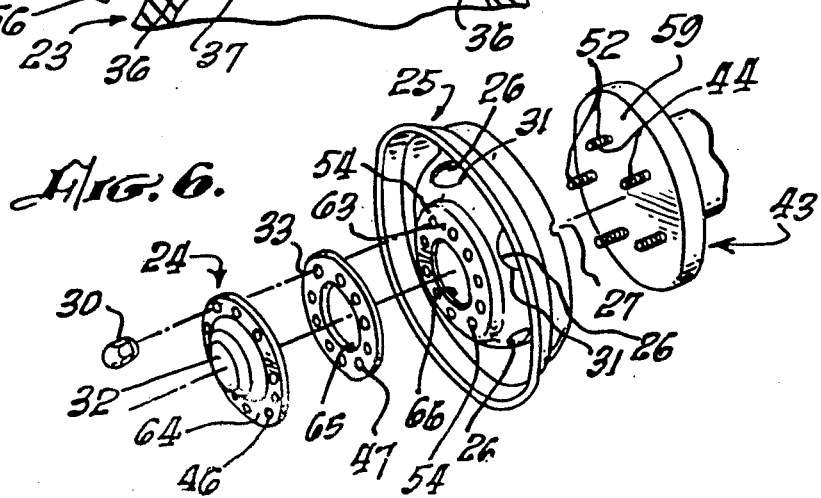

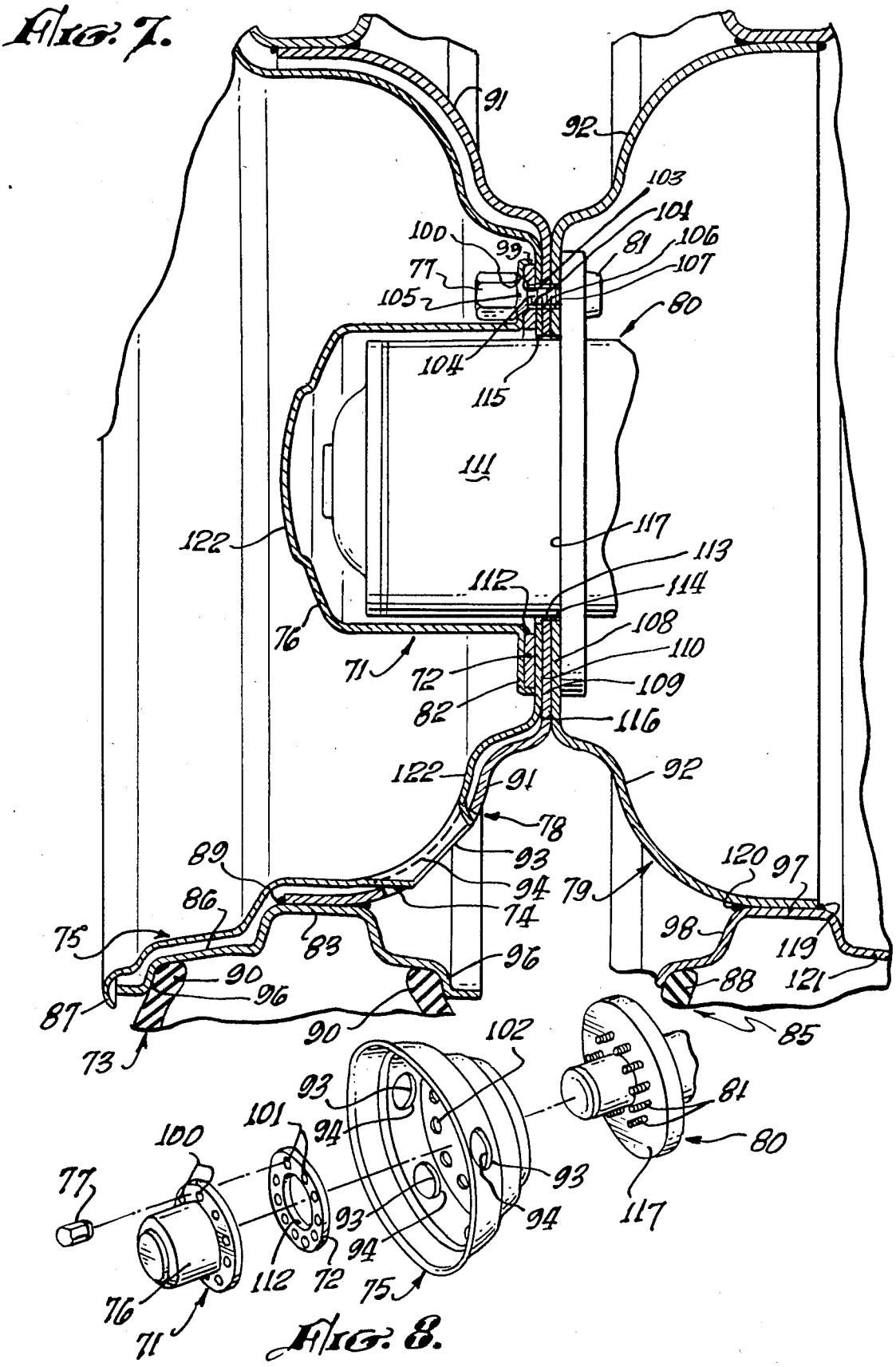

DECORATIVE WHEEL COVERING

BACKGROUND OF THE INVENTION

This invention relates generally to decorative wheel covers for use on motor vehicles and particularly to those used on trucks and campers having dual wheel rear axial combinations.

The increased popularity of small trucks and campers has resulted in use of such vehicles by a broader range of consumers. While previously supplied to consumers having little or no concern for aesthetic considerations, trucks and campers are now also being purchased and used by consumers having great interest in the appearance of the truck or camper. As a result, there has been increased attention to aesthetic considerations for such small trucks or campers. One aspect of this increased attention to truck and camper appearance has been the use of more decorative and eye appealing treatment of the wheels of the vehicles. There is also a continuing market for products which improve the appearance of large trucks.

In the typical dual wheel truck or camper, a single conventional wheel and suspension is utilized on the front of the vehicle while a quartet of wheels arranged in pairs at each end of the rear axle is utilized in back. Generally, the outer ones of the dual wheel pair have wheel structures best described as "deep-dished" or concave structures which are mounted to a hub or disk brake rotor in which a generally flat wheel mounting surface accommodates a plurality of threaded wheel studs extending outwardly and passing through apertures in the wheels themselves. A plurality of threaded wheel lugs are tightened upon the wheel studs to secure the wheel to the hub or drum. In accordance with generally accepted construction techniques, the wheels define a web portion extending out from the center of the wheel and terminating in an outwardly facing generally U-shaped annular rim which includes a pair of parallel bead walls. The latter receive and form a seal with the side wall beads of a tire. In most wheel constructions, the portion of the wheels extending outward and attached to the U-shaped rim define cooling apertures the purpose of which is to permit the flow of air about the cooling surfaces of the vehicle's braking unit tires. In most instances, the apertures through which the wheel studs pass and into which the wheel lugs extend to secure the wheel to the drum or hub assembly define chamfer surfaces which cooperate with corresponding conical surfaces on the wheel lugs to securely locate, secure and center the wheel with respect to the drum or hub assembly.

This conventional dual wheel structure renders the use of decorative wheel covers of the type commonly used on automobile wheels generally unsatisfactory for a number of reasons. One problem arises out of the greater load generally borne by the wheel assemblies of such trucks and campers. Under such loads, the wheel structures themselves often flex during vehicle motion. Since conventional automotive wheel covers generally include mechanisms well known in the art, to grasp the outer rim surfaces of the wheel such wheel flexing often causes objectionable creaking and squeaking noises. Under extreme flexing, the wheel covers may separate from the wheel entirely and be lost. In addition, conventional decorative wheel covers may also interfere with the operation of the cooling apertures in the wheel structures. Further, the deep concave structure of the outer wheel in a dual wheel configuration such as described above usually includes a protruding center hub structure which extends into the area which would be occupied by such conventional wheel covering devices.

As a result and consequence of the foregoing described problems arising in connection with the use of conventional wheel covers, consumers interested in enhancing the aesthetic appeal of their truck or camper vehicles often have the outer ones of the dual wheel pairs chrome plated. While this, of course, avoids the above described problems inherent in the use of conventional wheel covers, the chroming of the rear wheels is itself subject to several limitations. For example, it is extremely expensive to chrome plate such wheels in part because of their great size. The structure of such wheels typically comprises a wheel web which is separately fabricated and welded to the inner surface of the tire supporting rim. This in turn provides an internal seam adjacent the weld which is not readily plateable using conventional chrome plating operations. In order to overcome this, the chrome plating step is preceded by initially separating the weld. Thereafter, the separate pieces are plated and then rewelded. This process of separating, plating and rewelding the wheel is costly. In addition, problems beyond the additional expense are created in that the welded portion of the wheel tends to be subject to chipping and rusting which, of course, mars the aesthetic appeal of the chromed wheel. Beyond the foregoing problems within the chrome plating process itself, there are additional limitations on using chromed wheels. For example, because chrome plating is costly, it is generally carried forward only on the outer surface. Therefore, the chromed wheel may not be used in any rotational application in which the unplated side is to be exposed. Furthermore, the chrome plating itself is easily damaged particularly during removal or mounting of the chromed wheel. Finally, in their zeal to preserve the aesthetic appeal of the vehicle, consumers often find it necessary or desirable to chrome plate the spare wheel or wheels of the vehicle which, of course, further increases the costs involved.

There remains therefore a need in the art for a decorative wheel cover which provides an effective low cost alternative to chrome wheels without the accompanying problems of noise or loss caused by wheel flexing during vehicle motion.

SUMMARY OF THE INVENTION

Accordingly, it is a general object of the present invention to provide an improved decorative wheel cover for use with small trucks or campers. It is a more particular object of the present invention to provide such improved decorative wheel cover which does not produce noise or loosening as a result of wheel flexing during vehicle motion.

In accordance with the present invention, there is provided a decorative wheel covering for use on a motor vehicle in which the wheel assembly comprises a center wheel hub defining a flat wheel mounting surface and a plurality of wheel studs extending outwardly therefrom, a wheel having a generally flat center hub mounting surface which is configured to mate with the wheel hub and defines a plurality of apertures spaced in accordance with the wheel studs, and an annular plate overlying the hub mounting surface of the wheel and defining a plurality of apertures spaced about the annular plate in accordance with the spacing of the wheel studs, and a plurality of threaded lug nuts cooperating with and threaded upon the wheel studs to captivate the annular plate and wheel against the wheel hub. The wheel covering includes a wheel cover having a first portion conforming to the portion of the wheel secured between the wheel hub and the annular plate and defining a plurality of apertures spaced in accordance with the wheel studs and captivated between the wheel and the annular plate and a second portion configured to overly the outside surface of the wheel extending outward from the first portion to the region at which the wheel is joined to the wheel rim, and a third portion which extends outwardly from the second portion and overlies and extends beyond the outer side of the wheel rim and encloses the outer edge of the wheel rim together with a plate cover having a first portion configured to overly and conform to the portion of the annular plate overlying the hub mounting surface and a second central portion raised from the first portion of the plate cover having a generally convex dome-like shape. The second and third portions of the wheel cover are supported entirely as a result of the first portion being secured between the wheel and the annular plate and being supported in a closely spaced relationship to the wheel web and outer rim in such manner that a substantially constant spacing therebetween is maintained.

BRIEF DESCRIPTION OF THE DRAWINGS

The features of the present invention which are believed to be novel are set forth with particularity in the appended claims. The invention, together with further objects and advantages thereof may best be understood by reference to the following description taken in conjunction with the accompanying drawings in the several figures of which like reference numerals identify like elements and in which:

FIG. 1 is an elevation view of a truck camper having wheel coverings constructed in accordance with the present invention;

FIG. 2 is a detailed view of the front wheel covering of the present invention;

FIG. 3 is a detailed view of the present invention wheel covering fixed to a rear wheel of the vehicle;

FIG. 4 is a section view of the front wheel assembly and wheel covering of the present invention taken along section lines 4—4 of FIG. 2;

FIG. 5 is an enlargement of the structure surrounding the wheel studs shown in FIG. 4;

FIG. 6 is an exploded view of the front wheel mounting assembly and present invention wheel covering;

FIG. 7 is a section view taken along section lines 7—7 in FIG. 3; and

FIG. 8 is an exploded view of the rear wheel mounting assembly and present invention wheel covering therefore.

DESCRIPTION OF THE PREFERRED EMBODIMENTS

FIG. 1 sets forth a plan view of a small pickup truck generally identified by the reference character 10 having a body 11 and a cargo bed 12. The latter supports a camper unit 13 which, in accordance with customary design, rests upon bed 12 and is attached to body 11 by conventional means (not shown). Truck 10 further includes a plurality of windows 14 which surround a cab 18. The latter constructed in accordance with common practice provides accommodations, seating, and appropriate controls for the operator of truck 10. Body 11 defines a front wheel well 15 and a bumper 17 while bed 12 defines a rear wheel well 16. Truck 10 further includes a front wheel assembly 20, an outer rear wheel assembly 21 and an inner rear wheel assembly 22. The configuration of truck 10 shown in FIG. 1 is that of the well known dual wheel structure in which a single front wheel is situated upon each side of the vehicle on the front axles and a quartet of rear wheels is situated in pairs on either end of the rear axle. It will be apparent to those skilled in the art and readily understood that a second front wheel not visible in FIG. 1 is present on the other side of truck 10 and correspondingly a second pair of rear wheels also not visible in FIG. 1 are present on the other side of truck 10. For purposes of the present invention, the description set forth below will describe the details of the front wheel assembly 20 and the present invention wheel covering therefore and outer wheel assembly 21 and inner wheel assembly 22 together with the present invention wheel covering therefore. It should be understood, however, that an identical wheel covering for the respective front and rear wheels on the other side of vehicle 10 will, of course, be used to complete the wheel covering set.

With reference now to FIG. 2, front wheel assembly 20 includes a tire 23 shown in partial broken view, a plate cover 24 and a wheel cover 25. The latter defines a plurality of cooling apertures 26 and a plurality of aperture recesses 31 together with a valve stem aperture 27. A plurality of lug nuts 30 are by means described below in greater detail secured to plate cover 24.

FIG. 3 shows a similar view to that of FIG. 2 for outer rear wheel assembly 21 which includes a tire 73, a wheel cover 75 and a plate cover 71. Wheel cover 75 defines a plurality of cooling apertures 93 and a corresponding plurality of aperture recesses 94. Plate cover 71 further includes a cover extension 76, the shape of which is better understood by reference to FIG. 7. A plurality of lug nuts 77 secure plate cover 71 to wheel cover 75 by means set forth below in greater detail. Examination of FIGS. 2 and 3 shows an important advantage of the present invention in that wheel cover 25 and plate cover 24 completely cover the front wheel of front wheel assembly 20 and similarly, wheel 75 and plate cover 71 completely cover the outer rear wheel of outer rear wheel assembly 21.

Turning now to FIG. 4 which shows the present invention wheel covering for front wheel assembly 20 in section view, it should be understood that for purposes of description of the structural details of front wheel assembly 20, the wheel stud and lug nut described below in greater detail have been omitted from the drawing in the lower portion of FIG. 4. It will, however, be apparent to those skilled in the art that in the normal assembly of wheel assembly 20, each of the wheels studs are present and each have a lug nut threaded upon them which in accordance with generally accepted fabrication techniques is tightened to a specified torque. Front wheel 28 is constructed in accordance with conventional wheel fabrication techniques and defines a hub mounting surface 42 and a center aperture 49. Hub mounting surface 42 comprises a substantially flat annular surface surrounding center aperture 49 and defining a plurality of apertures 55. Hub mounting surface 42 terminates in a tangent circle 58 which forms a transition to a generally curved wheel web 41. Wheel web 41 defines a plurality of cooling apertures 48 which, as discussed above, provide for appropriate air flow about the wheel and tire assembly during vehicle motion. Web 41 terminates in a generally flat annular rim flange 60. Front wheel 28 further includes a wheel rim 34 which comprises a generally U-shaped annular member having a pair of bead walls 35 extending generally radially outward from rim flange 60 and an inner rim 40 which surrounds rim flange 60. Rim flange 60 and inner rim 40 are attached by a pair of welds 61 and 62 in accordance with well known fabrication methods. A tire 23 surrounds an air chamber 37 and includes a pair of tire beads 36 which are received between bead walls 35 of wheel rim 34. Consistent with well known practice, the pressure within air chamber 37 urges tire beads 36 against bead walls 35 such that a seal is formed which maintains air chamber 37 at the appropriate pressure. A wheel hub 43 defines a generally planar wheel receiving surface 59 which supports a circular array of wheel studs 44. Wheel studs 44 are pressed into appropriate apertures in wheel hub 43 (not shown) and provide threaded portions 52 which extend beyond wheel receiving surface 59. In the mounted position shown, wheel studs 44 extend through apertures 55 in front wheel 28 and beyond.

Wheel cover 25 defines a substantially planar wheel mating surface 63 which defines a center aperture 66 and a plurality of apertures 54. Apertures 54 are spaced about wheel mating surface 63 in accordance with the spacing of wheel studs 44. Wheel cover 25 further defines a multiple curved portion 71 which extends from wheel mating surface 63 to a reverse curvature portion rim recess 57. Rim recess 57 is configured to generally follow the contours of wheel rim 34 and terminates in a rim overlap 56. The latter comprises a generally curved portion which extends beyond the outer edge of bead wall 35 and returns toward tire 23. Wheel cover 25 further defines a plurality of cooling apertures 26 spaced in correspondence to cooling apertures 48 of front wheel 28. A plurality of aperture recesses 31 extend inwardly from wheel cover 25 into and beyond cooling apertures 48 and terminate in coling apertures 26. In accordance with an important aspect of the present invention, aperture recesses 31 are sized to extend into cooling apertures 48 without contacting the edges thereof. The importance of this aspect will be set forth below in greater detail. However, suffice it to say here that aperture recesses 31 have sufficient clearance from the boundaries of cooling apertures 48 that during wheel flexing described above, no contact is made between aperture recesses 31 and wheel web 41. Front wheel assembly 20 further includes a mounting plate 33 which comprises a generally flat annular plate defining a center aperture 65 and a plurality of apertures 47. The latter each define a chamfer 50 and are spaced about mounting plate 33 in correspondence to the spacing of wheel studs 44. Front wheel assembly 20 further includes a plate cover 24 defining a substantially flat plate surface 64 configured to overly mounting plate 33 and defining a curved return 45 which extends beyond the outer perimeter of mounting plate 33 and is curved toward wheel cover 25. Plate cover 24 defines a plurality of apertures 46 spaced about plate surface 64 in corrspondence to the spacing of wheel studs 44. Plate cover 24 further includes a center dome 32 which extends from plate surface 64 and rises away from mounting plate 33. Front wheel assembly 20 further includes a plurality of lug nuts 30 each of conventional design and each defining conical surfaces 51 the slopes of which are selected to correspond to and mate with those of chamfers 50. In accordance with the present invention, and as better understood by simultaneous reference to FIG. 4 and FIG. 5, wheel cover 25 is maintained between hub mounting surface 42 of front wheel 28 and mounting plate 33. As will be apparent to those skilled in the art, the tightening of lug nuts 30 upon threads 52 of wheel studs 44 places mounting plate 33, wheel cover 25 and hub mounting surface of front wheel 28 under compressive force. If lug nuts 30 are tightened to the predetermined torque normally applied to secure wheel 28 against wheel receiving surface 59 of wheel hub 43 the compressive force upon wheel mating surface 63 of wheel cover 25 secures the portion of wheel cover 25 from center aperture 66 to tangent circle 58. Outward from tangent circle 58 and with particular reference now to FIG. 4, wheel cover 25 is configured in substantial correspondence to the contours of wheel web 41 and wheel rim 34 with the difference that the curvature of wheel cover 25 at tangent circle 58 is selected to produce a spacing between wheel cover 25 and front wheel 28. Further, and in accordance with an important aspect of the present invention, wheel cover 25 is manufactured from a substantially rigid metal and is of sufficient thickness and integral strength that it maintains its configuration and spacing from wheel 28 without the need of further support or contact with other portions thereof. As a result, wheel cover 25 is fully secured by the compressive restraint upon wheel mating surface 63. The outer surface of wheel cover 25 is typically chrome plated or otherwise treated to give the desired surface appearance. Alternatively, the cover may be fabricated from stainless steel or other metal which has a desired surface finish.

Turning now to examination of plate cover 24 in the assembled configuration shown in FIGS. 4 and 5, it should be noted that apertures 46 in plate cover 24 are of larger diameter than apertures 47 in mounting plate 33. This permits plate cover 24 to be maintained in its position overlying mounting plate 33 without interference in the cooperation of conical surface 51 of lug nut 30 and chamfer 50 of mounting plate 33. For this reason, the diameter of aperture 46 is selected in accordance with the slope of conical surface 51 of lug nut 30 and the thickness of mounting plate 33 such that when lug nut 30 is fully tightened against mounting plate 33 and conical surface 51 mates with chamfer 50 and mounting plate 33, wheel cover 25 and hub mounting surface 42 are properly compressed the outer portion of aperture 46 abuts conical surface 51 maintaining plate cover 24 against mounting plate 33. While plate cover 24 is maintained secure against mounting plate 33, it does not interfere with the cooperation between conical surfaces 51 and chamfers 50. Therefore, no interference with the security of front wheel 28 mounting to wheel hub 43 results.

In addition, examination of cooling aperture 26 and aperture recess 31 reveals that cooling air is able to flow through the same cooling paths as previously provided by cooling aperture 48 in wheel 28. Therefore, the present invention wheel cover while completely covering the outer side of front wheel 28 from an aesthetics viewpoint does not interfere with the operation of cooling apertures 48 or the security of wheel mounting.

As mentioned above, and as should be apparent from an examination of FIG. 4, wheel cover 25 contacts front wheel 28 solely and exclusively in the region of wheel mating surface 63 and from tangent circle 58 outward no contact exists between front wheel 28 and wheel cover 25. This spacing between wheel cover 25 and front wheel 28 is in accordance with an important aspect of the present invention in which the absence of fasteners or securing devices beyond tangent circle 58 insures that notwithstanding substantial wheel flexing during vehicle operation no noise producing mechanism is present. In addition, because wheel cover 25 is secured tightly beneath mounting plate 33, the flexing and stressing of front wheel 28 does not operate to loosen the retention mechanism of wheel cover 25 as it does in conventional "rim grabbing" decorative wheel covers.

FIG. 6 sets forth an exploded perspective view showing the relationship between lug nuts 30, plate cover 24, mounting plate 33 and aperture 66 for assembly to wheel hub 43. For purposes of clarity, front wheel 28 has been omitted from FIG. 6. However, it will be understood, of course, that the assembly depicted in FIG. 6 is that which would normally include front wheel 28 between wheel hub 43 and wheel cover 25. Further examination of FIG. 6 shows the spaced correspondence between the circular arrangement of wheel studs 44 extending outwardly from wheel receiving surface 59 of hub 43 and the pluralities of apertures 54, 47 and 46 in wheel cover 25, mounting plate 33 and plate cover 24, respectively. To make assembly easier a "double set" of wheel stud apertures may be used in any or all of the assembled components.

FIG. 7 sets forth the section view of outer rear wheel assembly 21 and inner rear wheel assembly 22 in which a wheel hub 80 supports a plurality of wheel studs 81 which as set forth above are pressed into apertures (not shown) in wheel hub 80 and extend outwardly from a wheel receiving surface 117 of wheel hub 80. An inner wheel 79 defines a substantially planar hub mounting surface 108 which, in turn, defines a center aperture 114 and a plurality of apertures 107. The latter are spaced in a configuration corresponding to the spacing of wheel studs 81 upon wheel hub 80. Inner wheel 79 further defines a wheel web 92 which curves generally inward and terminates in a rim flange 118. A generally U-shaped annular wheel rim 98 defines an inner rim 37 secured to rim flange 118 by a pair of welds 119 and 120 and a pair of outwardly extending bead walls 121. The latter captivate a pair of tire beads 88 of a tire 85. In accordance with commonly exercised tire construction, tire 85 is inflated to force tire beads 88 against bead walls 121 of wheel rim 98 forming a seal which retains tire 85 within wheel rim 98.

An outer wheel 78 includes a hub mounting surface 109 which, in turn, defines a center aperture 113 and a plurality of apertures 106. The latter are spaced upon hub mounting surface 109 in accordance with the spacing of wheel studs 81 within wheel hub 80. Outer wheel 78 further includes a wheel web 91 extending outwardly from hub mounting surface 109 and terminating in a substantially flat annular rim flange 95. Wheel web 91 further defines a plurality of cooling apertures 74 which in accordance with the discussions above provide for the flow of cooling air about the vehicle's wheel and brake assemblies. Outer wheel 78 further includes a generally U-shaped annular wheel rim 86 having a generally flat inner rim portion 83 welded to rim flange 95 by a pair of welds 89 and a pair of outwardly extending bead walls 96. A tire 73 includes a pair of tire beads 90 which are received within bead walls 96 of wheel rim 86 and are retained therein by the above-described mechanism.

A wheel cover 75 defines a wheel mating surface 110 which, in turn, defines a center aperture 115 and a plurality of apertures 102. The latter are spaced about wheel mating surface 110 in accordance with the spacing of wheel studs 81 within wheel hub 80. Wheel cover 75 further includes a multiply curved portion 122 which extends radially outward from wheel mating surface 110 and generally follows the outer contour of wheel web 91, rim flange 95 and wheel rim 86 and terminates in a rim overlap 87. The latter extends beyond the outer edge of bead wall 96 of wheel rim 86 and curves back toward tire 73. Wheel cover 75 further defines a plurality of aperture recesses 94 which extend into and beyond cooling apertures 74 of wheel web 91 and terminate in cooling apertures 93. In accordance with an important aspect of the present invention described above, aperture recesses 94 do not contact wheel web 91 or the edge surfaces of cooling apertures 74.

An annular mounting plate 72 similar in construction to mounting plate 33 shown in FIGS. 4, 5 and 6 defines a center aperture 112 and a plurality of apertures 102. The latter are spaced in accordance with the spacing of wheel studs 81 and define outwardly facing chamfers 103. A plate cover 71 includes a generally flat plate surface 82 overlying mounting plate 72 and defining a plurality of apertures 100 spaced in correspondence to wheel studs 81 and a return 99 which extends beyond the perimeter of mounting plate 72 and curves inwardly to enclose the outer edge of mounting plate 72. Plate cover 71 further includes a cover extension 76 which comprises a generally cylindrical member extending outwardly from plate surface 82 and culminating in a dome surface 122. As will be apparent from examination of FIG. 7, the substantial outward projection of cover extension 76 is necessitated by the outward projection of hub shaft extension 111 of wheel hub 80. This is a characteristic of the rear drive axle configuration of truck 10 and, as will be apparent to those skilled in the art, such extended outward projection would not be necessary in the event wheel hub 80 is constructed without hub shaft extension 111.

Wheel cover 75 is maintained and secured beneath mounting plate 72 in accordance with the construction of plate cover 24 set forth above in great detail in connection with FIGS. 4 and 5 and need not be further elaborated upon at this point. However, it should be noted upon examination of FIG. 7 that both outer wheel 78 and inner wheel 79 are interposed between wheel cover 75 and wheel receiving surface 117 of wheel hub 80. The cooperation of wheel studs 81 and lug nuts 87 to compressively secure mounting plate 72, outer wheel 78 and inner wheel 79 as well as wheel mating surface 110 of wheel cover 75 are identical to that set forth above in connection with front wheel assembly 20. Similarly, the diameter of aperture 10 in cover plate 71 is selected in accordance with the slope of conical surfaces 105 of lug nuts 77 such that when lug nuts 77 are tightened to the specified torque, apertures 100 contact conical surface 105 thereby retaining cover plate 71 against mounting plate 72. As described above in connection with front wheel assembly 20, conical surfaces 105 of lug nuts 77 and chamfers 103 of mounting plate 72 cooperate to align and secure inner wheel 79 and outer wheel 78 with respect to wheel hub 80. Again, as was the case in connection with front wheel assembly 20, wheel cover 75 contacts outer wheel 78 solely and exclusively at wheel mating surface 110 and multiply curved portion 122 of wheel cover 75 departs from contact with hub mounting surface 109 of outer wheel 78 at tangent circle 116. From tangent circle 116 outward, multiply curved portion 122 of wheel cover 75 does not contact outer wheel 78. In accordance with an important aspect of the present invention and as described above for wheel cover 25, wheel cover 75 enjoys a similar freedom from any contact with outer wheel 78. The advantages of this construction are fully set forth above in relation to wheel cover 25 on front wheel assembly 20 and need not be reiterated here; however, in addition, it will be apparent to those skilled in the art from examination of wheel rim 86 of outer wheel 78 that the deep concave structure of outer wheel 78 and the generally flat slope of wheel rim 86 thereof present an even more difficult surface upon which to utilize conventional "rim grabbing" decorative wheel covers of the type used on automobile wheels than those of front wheel 28.

FIG. 8 shows an exploded view of the assembly relationship between wheel hub 80, wheel cover 75, mounting plate 72, plate cover 71 and lug nut 77. For purposes of clarity, inner wheel 79 and outer wheel 78 are not shown in FIG. 8. However, it will be understood that inner wheel 79 and outer wheel 78 are interposed between wheel cover 75 and wheel hub 80 in the normal assembly of the present invention structure.

What has been shown and described is a novel, decorative wheel covering in which the sole and exclusive contact between the wheel covering and the vehicle wheels is provided in the central region of the wheel cover and wheels and in which a separate plate cover overlies and is secured to the wheel mounting plate of the wheel assembly without interfering in the cooperation between the wheel stud and the lug nut in securing the wheels to the wheel hub. The wheel covering can be used on a wide variety of wheel sizes including but not limited to 6.75×16, 6.75×16.5, 8.00×19.5, 6.00×19.5, 11.00×22.5, 10.00×22.5, 10.00×24.5 and 11.00×24.5. The structure shown has considerable advantages over the conventional decorative wheel covers in that the absence of any contact between the wheel cover and the wheels outside the region of the mounting plate assures that no rubbing or other noise producing contact can occur between the wheel cover and the wheel.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. For use in a motor vehicle wheel assembly having a wheel-receiving surface, a plurality of threaded wheel studs extending therefrom, a plurality of cooperating threaded lug nuts, and a wheel having means for receiving and supporting a tire and defining inner and outer surfaces, said wheel defining a first plurality of apertures spaced in accordance with said wheel studs and being configured for mounting to said wheel-receiving surface and secured thereto by the cooperation of said wheel studs and said lug nuts, a wheel covering comprising:

a wheel cover configured to overly in a closely spaced, parallel and non-contacting relationship said outer surface of said wheel is mounted to said wheel-receiving surface and having a central support surface which defines a second plurality of apertures spaced in accordance with said wheel studs;

said wheel studs extending through said first and second pluralities of apertures and cooperating with said lug nuts to secure said central support surface of said wheel cover to said wheel, said central support surface providing the sole and entire support for said wheel cover such that the remainder of said wheel cover is maintained in a closely spaced but non-contacting relationship with said outer surface of said wheel.

said motor vehicle wheel assembly further includes an annular plate defining a third plurality of apertures spaced in accordance with said wheel studs, said annular plate being interposed between said central support surface of said wheel and lug nuts such that said wheel studs extend through said first, second, and third pluralities of apertures, and wherein said wheel covering includes;

a plate cover having a substantially flat annular portion defining a fourth plurality of apertures spaced in accordance with said wheel studs and a dome-shaped center extending radially from the center of said plate cover to said annular surface, said plate cover overlying said annular plate such that said wheel studs extend through said fourth plurality of apertures and said plate cover is secured to said annular plate by the cooperation of said wheel studs and said lug nuts.

2. A wheel covering as set forth in claim 1, wherein said lug nuts define conical end surfaces and wherein said apertures in said third plurality of apertures each define a chamfer surface facing said lug nuts and receiving said conical end surfaces when said wheel, said wheel cover, said annular plate and said plate cover are secured to said wheel-receiving surface.

3. A wheel covering as set forth in claim 2 wherein said wheel defines a first plurality of cooling apertures and wherein said wheel cover includes a corresponding second plurality of cooling apertures centered over said first plurality of cooling apertures.

4. A wheel covering as set forth in claim 3 wherein said second plurality of cooling apertures further define sloped surfaces extending through said first plurality of cooling apertures and beyond said inner surface of said wheel, said sloped surfaces being closely spaced to said first plurality of cooling apertures but not contacting said wheel.

5. A wheel covering as set forth in claim 2 wherein said means for receiving and supporting a tire include a generally U-shaped annular outer rim having an inner and an outer bead wall extending outwardly from the center of said wheel each terminating in perimeter and wherein said wheel cover extends outwardly beyond said outer bead wall and wraps around said perimeter of said outer bead wall toward said tire.

6. A wheel covering as set forth in claim 1, wherein said annular plate defines an outer perimeter and wherein said plate cover extends beyond said perimeter and toward said wheel cover.

7. For use on a motor vehicle having a plurality of wheel-receiving hubs each including a planar surface and a plurality of threaded wheel studs extending therefrom, a plurality of wheels each having a hub mounting surface configured to mate with said planar surface and defining a first plurality of apertures spaced in accordance with said wheel studs and a wheel web extending generally outward from said hub mounting surface and an outer rim configured to receive and support a tire, a plurality of lug nuts threaded to receive said studs and a mounting plate having a flat annular configuration defining inner and outer edges and defining a second plurality of apertures arranged to receive said wheel studs, a wheel covering comprising:

a wheel cover having,
- a first portion configured to mate with and mount to said hub mounting surface having a third plurality of apertures corresponding to said wheel studs and interposed between said hub mounting surface of said wheel and said mounting plate;
- a second portion extending radially outward from said first portion and configured to overly said wheel web in a substantially constant spaced apart relationship therewith, and
- a third portion connected to and continuous with said second portion and configured to overly said outer rim in a substantially constant spaced relationship, and a plate cover having,
- a first portion configured to mate with said mounting plate and defining a fourth plurality of apertures in a spaced relationship corresponding to said wheel studs,
- a second portion extending radially outward from said first portion and overlapping and surrounding at least a portion of said outer edge of said mounting plate, and
- a third portion extending radially inward from said first portion and defining a generally convex dome-shaped center surface;

said wheel studs and said lug nuts extending through said first, second, third and fourth pluralities of apertures to secure said wheel, said first portion of said wheel cover, said mounting plate and said first portion of said plate cover to said planar surface of said wheel-receiving hub.

* * * * *